United States Patent [19]
Brug et al.

[11] Patent Number: 5,307,226
[45] Date of Patent: Apr. 26, 1994

[54] IMPROVED MAGNETORESISTIVE TRANSDUCER WITH SUBSTANTIALLY PERPENDICULAR EASY AXIS

[75] Inventors: James A. Brug, Menlo Paark; Thomas C. Anthony, Sunnyvale; Victor W. Hesterman, Los Altos Hills; Steven Naberhuis, Fremont, all of Calif.

[73] Assignee: Hewlett-Packard Company, Palo Alto, Calif.

[21] Appl. No.: 894,415

[22] Filed: Jun. 5, 1992

[51] Int. Cl.⁵ .......................................... G11B 5/127
[52] U.S. Cl. ................................. 360/113; 324/252; 338/32 R
[58] Field of Search ...................... 360/113; 324/252; 338/32 R

[56] References Cited

U.S. PATENT DOCUMENTS

| | | | |
|---|---|---|---|
| 3,716,781 | 2/1973 | Almasi et al. | 324/46 |
| 3,921,218 | 11/1975 | Kayser | 360/113 |
| 4,001,890 | 1/1977 | Kayser | 360/113 |
| 4,103,315 | 7/1978 | Hempstead et al. | 360/113 |
| 4,356,523 | 10/1982 | Yeh | 360/113 |
| 4,987,509 | 1/1991 | Gill et al. | 360/113 |

FOREIGN PATENT DOCUMENTS

0326192A2  2/1989  European Pat. Off. .
0430672A2  5/1991  European Pat. Off. .

OTHER PUBLICATIONS

R. Suyana et al., "Thin Film MR Head for High Density Rigid Disk Drive", Nov. 1988, IEEE Trans. Mag., vol. 24, No. 6, pp. 2612-2614.

A. V. Pohm, "The Reversed Word Filed Switching Threshold", Sep. 1990, IEEE Trans. Mag., vol. 24, No. 3, pp. 2020-2023.

Primary Examiner—Richard A. Bertsch
Assistant Examiner—Alfred Basichas

[57] ABSTRACT

A magnetoresistive transducer includes at least one magnetoresistive element having a transverse easy axis. The use of a transverse easy axis prevents magnetic domains from forming in the magnetoresistive elements and results in a noise-free device. Various techniques for producing a transverse easy axis include the use of stress, and a magneto strictive material, during the formation of the element to orient the anisotropy of the element transverse to orient the anisotropy of the element transverse to the element, formation of the element in the presence of a magnetic field, high temperature anneal of the element, or any other method of forming the element with a prebiased state.

2 Claims, 3 Drawing Sheets

IMPROVED MAGNETORESISTIVE TRANSDUCER WITH SUBSTANTIALLY PERPENDICULAR EASY AXIS

BACKGROUND OF THE INVENTION

1. Technical Field

The present invention relates to magnetoresistive transducers. More particularly, the present invention relates to an improved magnetoresistive read transducer having a transverse easy axis for biasing and domain stabilization.

2. Description of the Prior Art

Continuing advances in magnetic media technology allow increasing data storage densities. One active area of development is that of reading transducers. As such transducers are made smaller, data densities are increased. Magnetoresistive (MR) thin film technology has provided a particularly promising area of inquiry with regard to producing smaller reading transducers. In such technology, conductive thin films are formed on a substrate using techniques analogous to those of the semiconductor arts.

The present state of the art teaches the use of magnetoresistive elements having an easy axis in-plane and along the length of the MR elements. In this configuration, magnetic poles exist at the ends of the stripes and thus result in instabilities, unwanted domain states, and unpredictable response curves. This arrangement is currently in use for the three basic geometries which employ MR technology: single layer structures, soft adjacent layer (SAL) structures where an additional magnetic film is provided to help in biasing the transducer, and dual stripe structures in which both films are magnetoresistive.

Magnetoresistive memory elements have been discussed by Pohm and Comstock, IEEE Trans. Mag. 26, 2529 (1990), which use transverse anisotropy in coupled magnetic films for storing digital information, but not for sensing magnetic fields. However, there is yet to be taught any technique for applying this approach to magnetoresistive transducers, nor is there any recognition that such teachings would be useful in the transducer arts.

SUMMARY OF THE INVENTION

The present invention provides an improved magnetoresistive read transducer. In the preferred embodiment of the invention, a magnetoresistive transducer includes at least one magnetoresistive element having a transverse easy axis. In this way, magnetic domains are prevented from forming in the MR elements. Thus, noise-free operation is provided.

In accordance with the present invention, one technique for assuring the MR elements have a transverse easy axis is to take advantage of the magnetostrictive properties of MR elements and form such elements with stress such that the anisotropy of the resulting element produces a transverse easy axis. Other techniques that may be used to orient the easy axis transverse to the MR element may include MR element deposition in the presence of a magnetic field, MR element anneal at a high temperature, or any other method for establishing a prebiased state in the MR element.

DETAILED DESCRIPTION OF THE INVENTION

Figures 1A, 1B, 1C, 1D:
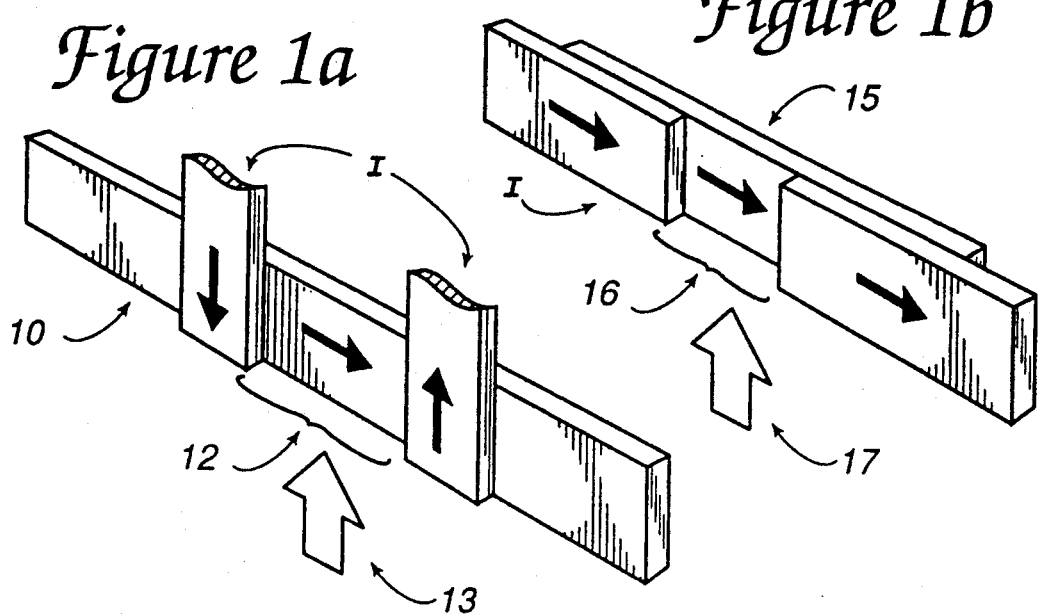
FIG. 1a is an elevation of a single-stripe read structure with current leads transverse to a magnetoresistive element according to the present invention.
FIG. 1b is an elevation of a single-stripe read structure with current leads along the magnetoresistive element according to the present invention.
FIG. 1c is an elevation of a soft adjacent layer (SAL) read structure according to the present invention.
FIG. 1d is an elevation of a dual-stripe read structure according to the present invention.

The present invention is best understood by referring to the Drawings in connection with review of this Description. The present invention provides a magnetoresistive (MR) read head in which the easy axis of the magnetic films that form the read element are defined in such as way as to provide biasing and stabilization of the domain structure. The preferred embodiment of the invention is described herein with regard to three geometries of MR read heads: a single layer structure (as shown in FIGS. 1a and 1b), a soft adjacent layer (SAL) structure in which an additional magnetic film is provided to improve biasing (as shown in FIG. 1c), and a dual-stripe structure in which both films are magnetoresistive elements (as shown in FIG. 1d).

The present invention provides a structure for all three transducer geometries having the easy axis of the magnetization in-plane but transverse to the length of the elements. In FIG. 1a, a single-stripe read structure is shown having current leads transverse to the MR element. In the Fig., a magnetoresistive element 10 is shown having an active area 12 in the presence of a media field (indicated by the arrow 13). Current leads 'I' are indicated by the arrows which point in the direction of current flow.

In FIG. 1b, a single-stripe read structure is shown having current leads along the MR element. In the Fig., a magnetoresistive element 15 is shown having an active area 16 in the presence of a media field (indicated by the arrow 17). Current leads 'I' are indicated by the arrows which point in the direction of current flow.

In FIG. 1c, a soft adjacent layer structure is shown having current leads transverse to the MR element. In the Fig., a magnetoresistive element 20 is shown having an active area 22 in the presence of a media field (indicated by the arrow 23). A soft magnetic film 21 is shown and is included to help in biasing the MR element. Current leads 'I' are indicated by the arrows which point in the direction of current flow.

In FIG. 1d, a dual-stripe read structure is shown having current leads transverse to the MR element. In the Fig., magnetoresistive elements 25,26 are shown having an active area 27 in the presence of a media field (indicated by the arrow 28). Current leads 'I' are indicated by the arrows which point in the direction of current flow.

Figure 2A:
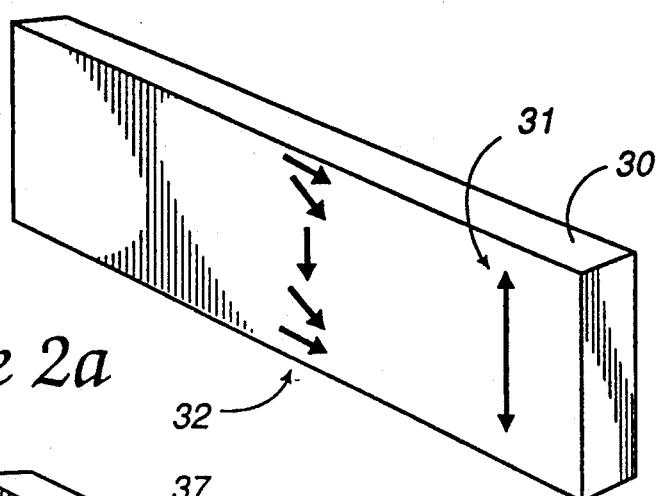
FIG. 2a is an elevation showing magnetization distribution in a single layer structure with no media field applied.

The distribution of magnetization in a single layer film with no field applied is shown in FIG. 2a. In the Fig., a magnetoresistive element 30 is shown having a transverse easy axis orientation 31. Magnetization direction 32 is as indicated by the arrows on the MR element 30.

Figure 2B:
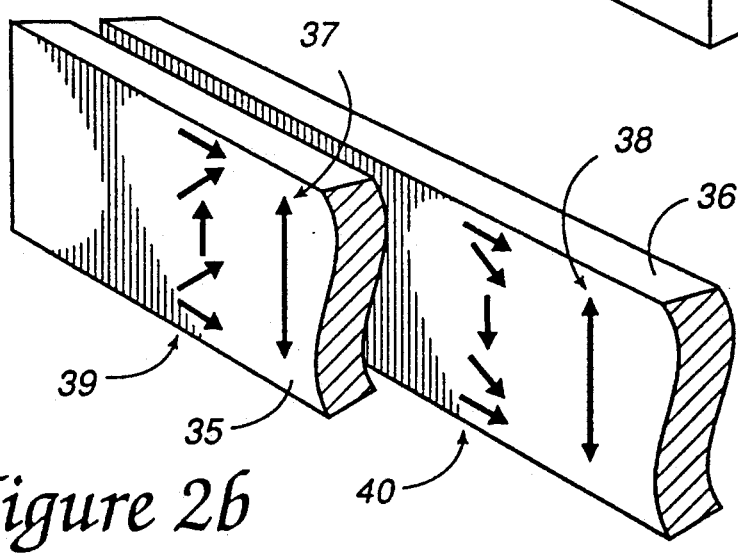
FIG. 2b is an elevation showing magnetization distribution in a bilayer structure with no media field applied.

In FIG. 2b, the distribution of magnetization for a bilayer film with no field applied is shown. In FIG. 2b., dual magnetoresistive stripes 35,36 are shown having a transverse easy axis orientation 37,38. Magnetization direction 39,40 is as indicated by the arrows on the respective MR elements 35,36.

In FIGS. 2a and 2b, the magnetization at the center of the MR element is oriented transversely because of the easy axis orientation in the magnetic film. At the edges of the device, the magnetization is oriented along the element because of the demagnetizing fields associated with the edge of the film. Adequate signal response is maintained by using structures with small heights of several micrometers or less such that only the center of the MR element is oriented transverse to the element.

It should be noted that bilayer transducer structures require less material anisotropy to overcome the demagnetizing fields associated with the edge because of the strong magnetostatic coupling between the two films. In bilayer transducer structures, the sense current that flows in the device provides a field that is also oriented in the transverse direction. In a dual-stripe transducer structure, the field is in opposite directions in each of the MR elements. In SAL structures, the current only flows in one element, but the strong coupling between the films results in a rotation of the magnetization that is also in opposite directions in each of the elements. The current can be used to initialize the device into the magnetic state shown in FIG. 2b because the field from the current and the easy axis are in the same direction.

The easy axis of the MR elements can be defined by using a variety of standard methods. For example, deposition of the MR element in a field or annealing the film at high temperature in a field are two possible methods. An additional method, is to use magnetic films with magnetostriction such that when fabricated, the stresses produced in the transducer structure from the formation of the air bearing surface result in a transverse easy axis. The specific features of the read head, such as the presence of magnetic shields, the magnetoresistive element shape, and the lead configuration are a matter of choice.

The mechanism by which the MR element is initialized into the stable state is a result of the sense current. The field from the sense current is along the easy axis of the film and is in opposite direction in either MR element. These directions favor the antiparallel state shown in FIG. 2b and, as a result, the device can be initialized into this state by the current. This does not occur in a conventional head because the desired single domain state is transverse to the sense current and therefore the current does not couple to it.

One important aspect of the present invention is that magnetic domains are prevented from forming in the MR elements, resulting in noise free operation. In the present invention, MR read transducers were fabricated with transverse anisotropy. An external field was used to excite the transducer. The output of these transducers for four field cycles is plotted on FIG. 3. The reproducibility of the response is an indication of the lack of magnetic domain walls in the active area of the device.

Figure 4:
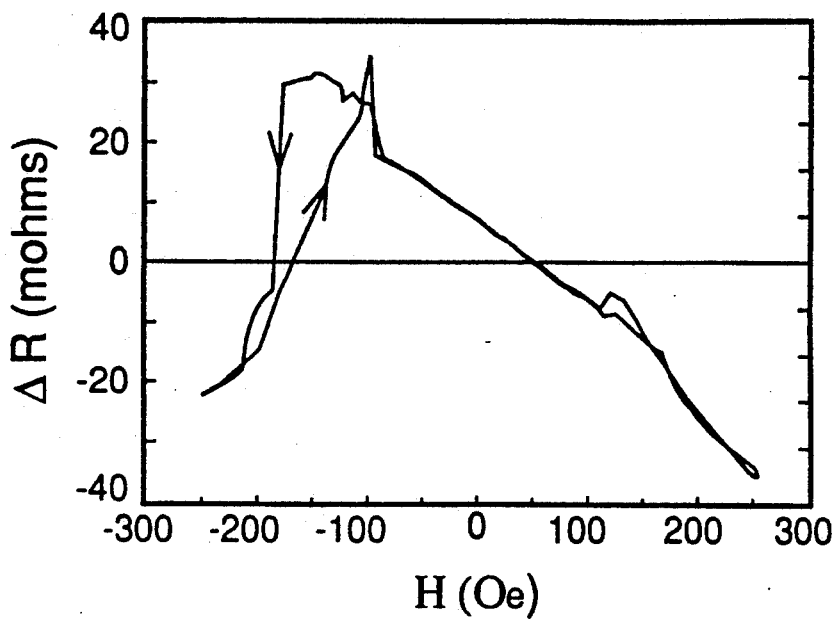
FIG. 4 is a response curve showing behavior of one stripe of a dual-stripe magnetoresistive read head plotting a larger field than is shown in FIG. 3.

If a larger field is used to excite the device, then the response is as shown in FIG. 4. The large jumps that occur at high fields indicate that when a large enough field is applied, the device can be made to switch to another state. However, on return to a lower field, the device initializes itself again into a stable state. This ability to re-initialize into a stable, noise free state is important when a read transducer is designed that includes an attached write transducer because of the large fields that can be present near the write transducer.

Figure 3:
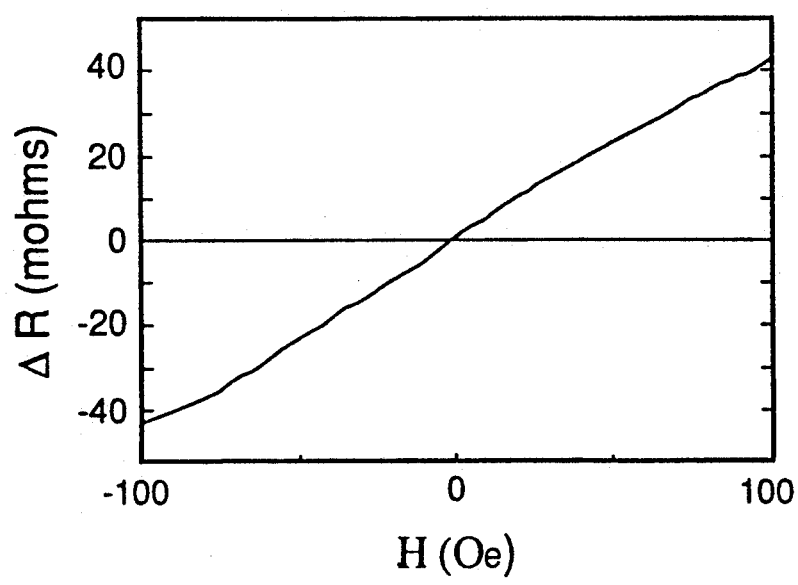
FIG. 3 is a response curve of a dual-stripe magnetoresistive read head with transverse anisotropy.

The strongly linear region that is shown in FIGS. 3 and 4 for low fields is also a result of the transverse anisotropy. The linearity can be shown from a micromagnetic model to arise from the cancellation of the longitudinal shape anisotropy by the transverse anisotropy. This linearity is especially important for SAL devices because, with current biasing, the device response is nonlinear.

Figure 5:
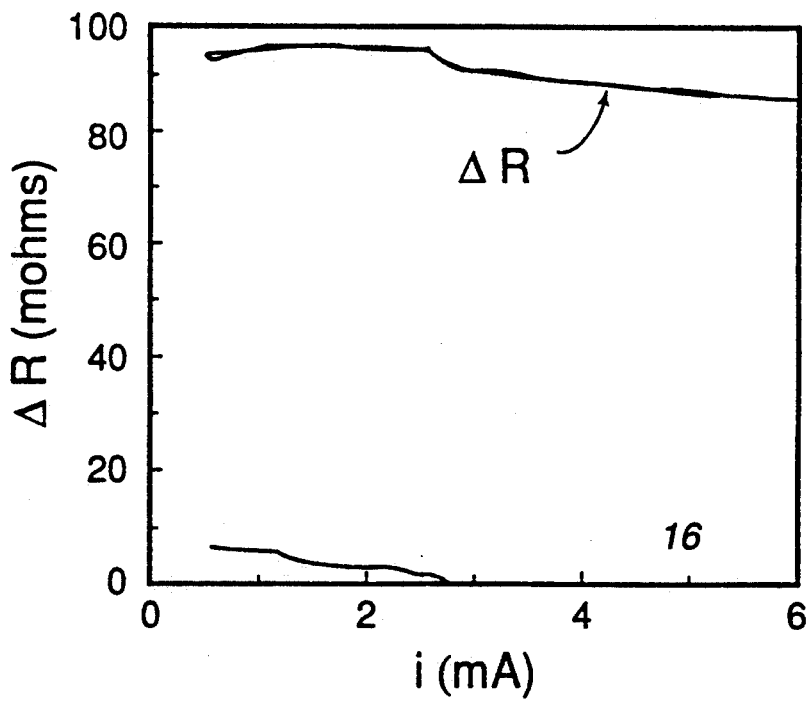
FIG. 5 is a graph plotting the dependence of the output resistance swing as the bias current is varied for a dualstripe magnetoresistive head having transverse anisotropy and in which data is shown for both increasing and decreasing currents.

An additional advantage of the invention is that the bias of the device is set primarily through the action of the anisotropy and the shape of the device, and only set secondarily by the current. This feature is shown in FIG. 5, where the behavior as a function of the bias current is plotted. The lack of variation in total resistance swing as the bias current is varied is a result of the transverse anisotropy producing a prebiased state in the MR elements. This makes it easier to set the current level to achieve maximum signal without strongly affecting the bias point of the device. In addition, the output remains constant as the current is cycled from low current to high current. This aspect of the invention is important to assure that the head returns to the same state when turned on, especially if this is done after each write cycle.

The ability to bias the MR element by transverse anisotropy is important for the single layer devices shown in FIGS. 1a and 1b. These devices do not need an extra layer of magnetic material or an extra conductor to provide a bias field. This reduces the number of films that need to be deposited to fabricate the device and allows narrower gaps in the active region to be achieved.

Magnetoresistive elements having thicker films can be used with the present invention. With conventional elements, biasing thick films is a problem because of the larger shape demagnetizing fields produced by the larger magnetization. The transverse easy axis of the present invention helps to overcome the shape effects allowing the device to be biased. Thicker films have, in principle, less noise because the texture of the surface plays less of a role in determining their magnetic behavior.

The stabilization of the MR elements is achieved without additional processing. For example, establishing a preferred direction along the easy axis for elements having the easy axis along the length of the elements has often been done using exchange-coupled layers. This requires additional processing and involves maintaining precise control of the materials. The present invention establishes the easy axis direction by controlling only the material properties of the MR element itself.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A magnetoresistive transducer, comprising: a least one magnetoresistive element oriented parallel to a magnetic storage medium surface, said element having a substantially perpendicular easy axis relative to said magnetoresistive element, whereby noise-free transducer operation is provided.

2. The transducer of claim 1, said magnetoresistive element having a height of several micrometers or less such that the magnetization at the center of the element is oriented transverse to the element, the center of said element thus having anisotropy oriented to produce a magnetization substantially perpendicular to said element.

* * * * *